United States Patent [19]

Journee et al.

[11] Patent Number: 5,070,573
[45] Date of Patent: Dec. 10, 1991

[54] CLEARANCE COMPENSATING CONNECTOR TO COUPLE A WIPER ARM TO A WIPER BLADE

[75] Inventors: Maurice Journee, Reilly; Jean Duda, Villeneuve-Les-Sablons; Pierre Beneteau, Gorcy; Jean-Raymond Bru, Beauvais, all of France

[73] Assignee: Paul Journée, S.A., Colombes Cedex, France

[21] Appl. No.: 597,358

[22] Filed: Oct. 10, 1990

[30] Foreign Application Priority Data

Oct. 13, 1989 [FR] France .................. 89 13430

[51] Int. Cl.$^5$ .............................................. B60S 1/40
[52] U.S. Cl. ................................... 15/250.32; 403/279
[58] Field of Search ........... 15/250.32, 250.31, 250.35, 15/250.42, 250.33, 250.36; 403/277, 248, 279, 280

[56] References Cited

U.S. PATENT DOCUMENTS

| | | | |
|---|---|---|---|
| 3,576,044 | 4/1971 | Besnard ......................... | 15/250.32 |
| 4,324,019 | 4/1982 | Mohnach et al. ............... | 15/250.32 |
| 4,343,064 | 8/1982 | van den Berg et al. ......... | 15/250.32 |
| 4,450,602 | 5/1984 | Maiocco ......................... | 15/250.32 |
| 4,598,438 | 7/1986 | Egner-Walter et al. ......... | 15/250.32 |
| 4,670,934 | 6/1987 | Epple et al. .................... | 15/250.32 |

FOREIGN PATENT DOCUMENTS

| | | | |
|---|---|---|---|
| 721442 | 11/1965 | Canada ........................... | 15/250.32 |
| 1087481 | 8/1960 | Fed. Rep. of Germany ... | 15/250.32 |
| 2919960 | 11/1979 | Fed. Rep. of Germany ... | 15/250.32 |
| 2506704 | 12/1982 | France . | |
| 2630069 | 10/1989 | France . | |

Primary Examiner—Harvey C. Hornsby
Assistant Examiner—Gary K. Graham
Attorney, Agent, or Firm—Dennison, Meserole, Pollack & Scheiner

[57] ABSTRACT

A connecting device for connecting a windshield wiper blade on to a windshield wiper arm includes a securing element for cooperation with an opening formed on the wiper blade, together with a pivoting coupling element for articulation with the wiper arm whereby to obtain a pivoted connection between the blade and the arm. The connecting device includes means for absorbing any clearance between the securing element and the opening, together with a locking element for locking the securing element on to the blade and for activating the means for absorbing clearance.

The invention is applicable particularly to automotive vehicles.

10 Claims, 2 Drawing Sheets

CLEARANCE COMPENSATING CONNECTOR TO COUPLE A WIPER ARM TO A WIPER BLADE

FIELD OF THE INVENTION

The present invention relates to a connecting device for articulation of a windshield wiper blade to a windshield wiper arm, in particular for an automotive vehicle.

BACKGROUND OF THE INVENTION

A connecting device of the above type commonly comprises firstly a securing element for securing it on to the wiper blade, and secondly a pivoting coupling element for articulation with a windshield wiper arm in such a way as to obtain a pivoted coupling between the wiper blade and the wiper arm. The securing element is arranged to cooperate with an opening or window which is provided on the blade, and more particularly on the back of the main stirrup which forms part of the carrier for the flexible wiping strip of the blade.

Such a connecting device, however, has a number of disadvantages in connection with the securing element which cooperates with the blade. For example, the window which is provided on the blade, and the securing element, are both manufactured with tolerances, which, when the latter comes into cooperation with the former, give rise to the likelihood that there will be a clearance between the securing element and the window.

Thus in operation, after being fitted to the wiper blade, the coupling element is loose with respect to the window. This gives rise to wear of the cooperating surfaces, and this wear in turn increases the clearance or play between the securing element and the window. When the wiper is in operation, this clearance involves discontinuity in the transmission of force, by setting up jumping or grazing of the wiping strip on the surface being swept. The latter is typically the windshield of an automotive vehicle. Such jumping or grazing not only causes disagreeable noises, but also poor quality of wiping which leads to poor visibility for the driver.

In addition, this wear takes the form of deterioration of the surfaces of the opening in contact with the securing element, by degradation of the coating or other surface treatment on the various surfaces, thus leading rapidly to corrosion of the latter. In addition, the window of the wiper blade is generally provided with a transverse axis or pin for locking the securing element on to the blade, and the provision of this axis involves an additional manufacturing operation on the blade, which thus increases its cost.

DISCUSSION OF THE INVENTION

The present invention aims to overcome these drawbacks by proposing a connecting device which enables any source of clearance or play between the securing element and the window in the blade to be avoided, and to do so in a very simple way.

In accordance with the invention, there is provided a connecting device for articulation of a windshield wiper blade on a windshield wiper arm, in which the said connecting device has a securing element adapted to cooperate with an opening formed on the windshield wiper blade, and a pivoting coupling element for coupling with the windshield wiper arm, characterised in that the connecting device includes means for absorbing clearance between the securing element and the opening of the windshield wiper blade, together with a locking element for locking the said securing element on the blade and for activating the said means for absorbing clearance.

The connecting device in accordance with the invention thus allows very precise guidance of the blade to be obtained with respect to the arm, by removing any possible occurrence of play between the securing element and the opening in the blade.

Further features and advantages of the invention will appear more clearly from the description which follows, which is given by way of example only, and with reference to the accompanying drawings.

DESCRIPTION OF PREFERRED EMBODIMENTS OF THE INVENTION

Figure 1:
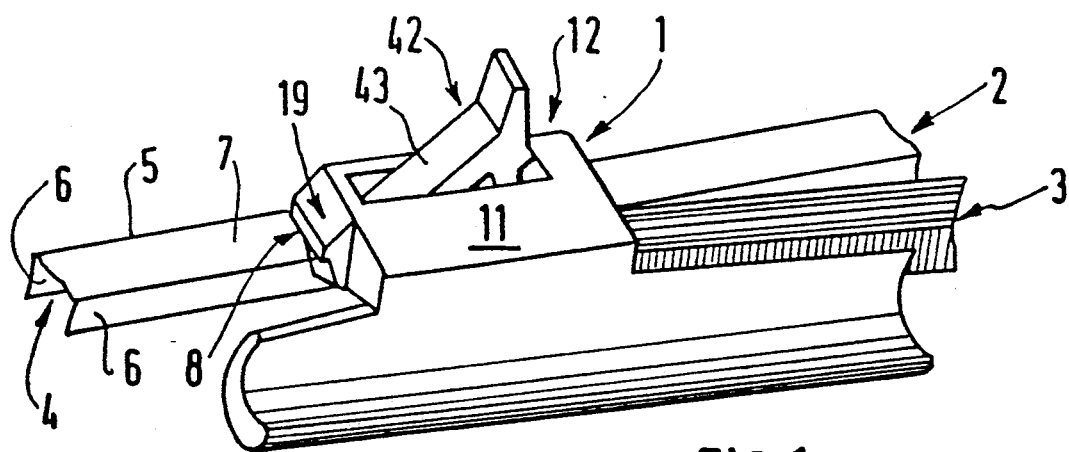
FIG. 1 is a perspective view of the connector in accordance with the invention, disposed between the windshield wiper arm and the windshield wiper blade.
Figure 2:
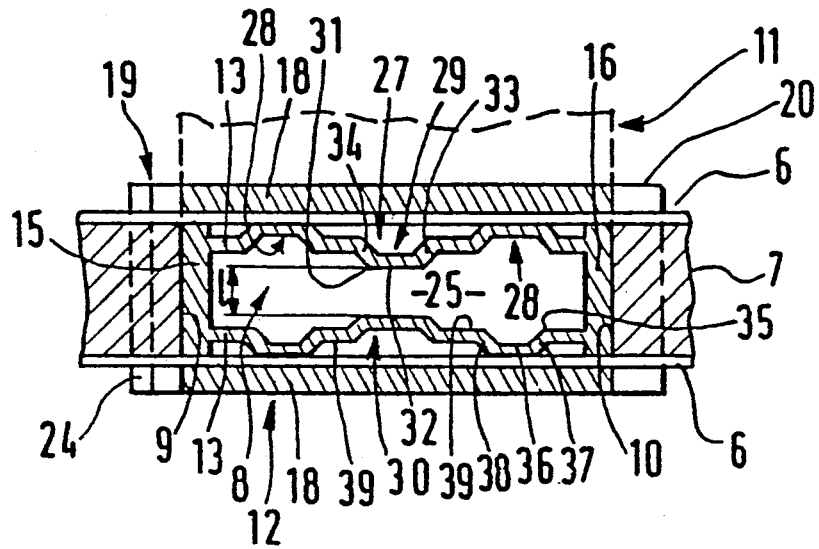
FIG. 2 is a view in cross section through the central web of the main stirrup of the blade carrying the connecting device in accordance with the invention.
Figure 3:
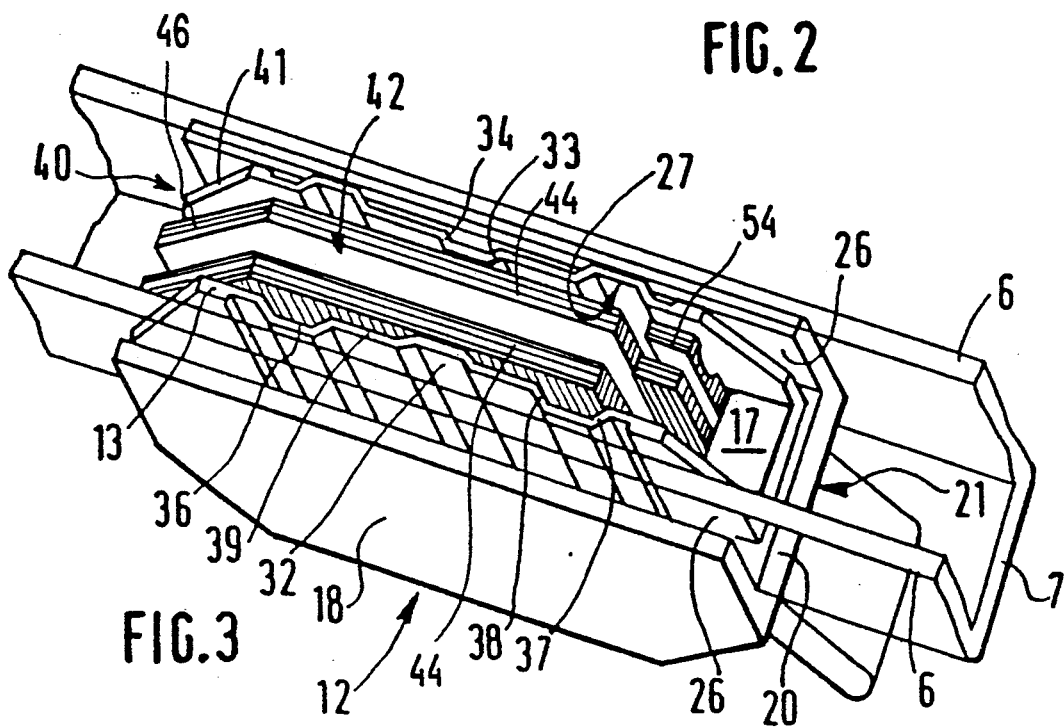
FIG. 3 is another view in perspective, showing the connecting device according to the invention as seen in the direction of the arrows in FIGS. 4 and 6.

Referring to the accompanying drawings, and particularly to FIGS. 1 to 3, the connecting device 1 provides a pivoting connection between a windshield wiper blade 2 and a windshield wiper arm 3. The windshield wiper blade comprises, in known manner, a carrier 4 for a wiping strip (not shown). The carrier 4 generally comprises a main stirrup 5, which is elongated and slightly curved and which has a cross section defining a U-shaped channel with flanks 6. The flanks 6 are substantially parallel to each other and perpendicular to the central web 7 of the U-shaped channel. The wiping strip is carried, by means of support arms (not shown), on the main stirrup 5.

The main stirrup 5 includes at the level of its back 7 an opening or window 8 which is delimited in a first direction by the flanks 6 of the U-shaped channel of the stirrup, and in the longitudinal direction by two edges, namely a front edge 9 and a rear edge 10 (the front edge being that shown in FIG. 2 on the left hand side of the opening and the rear edge that on the right hand side of the opening). The windshield wiper blade 2 is coupled, again in known manner, pivotally to the wiper arm 3 through a pivoting coupling element 11, which may be of the kind described in French published patent application No. FR 2 630 069A.

In the example described below of an arrangement in accordance with the invention, it will be taken that the windshield wiper arm 3 is disposed parallel to the blade, being connected to the latter through the pivoting coupling element 11. The latter will not itself be described any further herein.

As is shown in the drawings, the connecting device is arranged to be carried partly in the opening 8 formed in the main stirrup 5. For this purpose, the connecting device 1 includes a securing element 12 which comprises two longitudinal internal plate portions 13, the length of which is at least equal to the length of the opening 8. These plate portions 13 are spaced away from each other so that they can cooperate with the inner surfaces of the flanks 6 of the U-shaped channel formed in the main stirrup 5.

Figure 4:
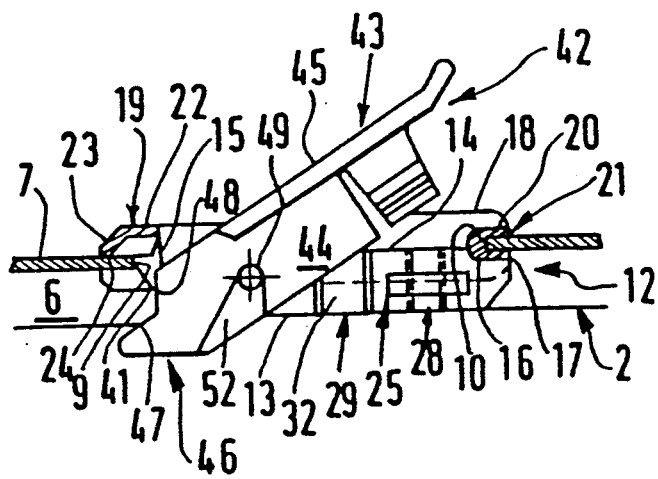
FIGS. 4 and 5 show the different elements and stages of fitting of the connecting device according to the invention.
Figure 5:
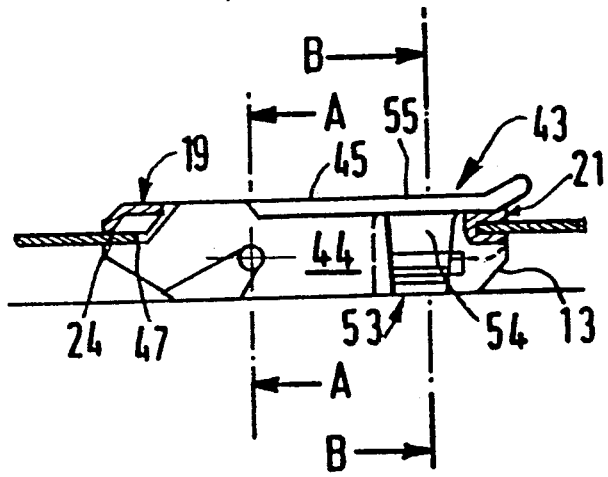

With reference now to either FIG. 4 or FIG. 5, the internal plate portions 13 are substantially in the form of a trepezium, the larger base line 14 of which is situated close to the opening 8. The plate portions 13 are joined to each other at the level of their longitudinal ends, by means of a front wall 15 and a rear wall 16 extending from the edge of the long sides 14.

The rear wall 16 is extended towards the smaller base lines of the internal plate portions 13 by a flank 17 which is substantially parallel to the central web 7 of the U-shaped channel, away from the wall 16. The flank 17 also connects the longitudinal ends of the internal plate portions 13.

External plate portions 18 are disposed on the outside of the internal plate portions 13, being parallel to the latter and spaced from them by a distance which is at least equal to the thickness of the flanks 6 of the U-shaped channel. These external plate portions are connected at the level of their longitudinal ends through a front cross wall 19 and a rear flank 20. The rear flank 20 extends in a direction substantially parallel to the direction of the central web 7 of the U-shaped channel, opposite to the wall 16, and is an extension of the latter so as to form with it a rear claw 21. This rear claw is of U-shaped cross section as can be seen in FIG. 4, having flanks 17 and 20 which grip the rear edge 10 of the opening 8, the wall 16 being adjacent to this edge. Thus, at the level of the longitudinal rear ends of the plate elements, the internal plate portions 13 are connected to each other and also to the external plate portions 18, the latter also being connected together.

The front cross wall 19 comprises a flat first portion 22 which is spaced away from the central web 7 of the U-shaped channel but parallel to it, the cross wall 19 being extended by a curved portion 23 which terminates in a free edge 24 for engaging on the outer surface of the central web 7, as will be explained below.

In addition, the front wall 15, which connects the internal plate portions 13 together at one of their longitudinal ends, extends towards the flat portion 22 of the cross wall 19 and is connected to it. The internal plate portions 13 and the external plate portions 18 are thus permanently connected to each other through each of their ends.

The securing element 12, constructed as described above, has firstly a central opening 25 defined by the internal plate portions 13, the front wall 15 and the rear wall 16, and secondly a plurality of grooves 26, which are open at their ends and formed between the internal plate portions 13 and the external plate portions 18. These grooves 26 have partial bases, which are defined in one of the grooves by the inner face of the rear flank 20 of the claw 21, and in the other groove by the association of the free edge 24 of the front cross wall 19 with a base surface formed in the front wall 15 at a level substantially the same as that of the free edge 24.

The securing element 12 also has means for absorbing longitudinal clearance, that is to say any clearance that may occur in a direction corresponding to the greatest length of the main stirrup 5; and means for absorbing transverse clearance, i.e. any clearance that may occur in the direction at right angles to that just mentioned. The means, 27, for absorbing transverse clearance comprise resilient means consisting of at least two outward projections 28 of the internal plate portion 13 together with at least one inward projection 29 of the internal plate portion 13. The inward projection lies between two successive outward projections. As is best seen in FIG. 2, the outward projections 28 and the inward projections 29 are defined by alternate bends, formed in the plate portions 13 and located on either side of the general longitudinal direction of the latter.

Each inward bent portion 31 defining an inward projection 29 consists of a flat portion 32 which lies spaced away from the general longitudinal direction of the corresponding internal plate portion 13, while being substantially parallel to the latter and located within the central opening 25. The ends of the flat portion 32 are joined to the main longitudinal portions of the plate portion 13 through inclined portions 33 and 34.

The outwardly bent portions 35 defining the outward projections 28 comprise further flat portions 36, which again lie spaced away from the general direction of the internal plate portion 13 and are again substantially parallel to it. They are however located in a direction opposite to that of the flat portion 32. Each flat portion 36 is joined to the main sections of the plate portion 13 through inclined portions 37 and 38. These main sections of the plate portions 13 are indicated at 39 and comprise flat zones which define the above mentioned general direction of the internal plate portion 13. As seen in FIG. 2, each plate portion 13 thus has a cross sectional shape in the form of a quincunx. The means for absorbing longitudinal clearance are indicated at 40 in FIG. 3. They comprise one of the inclined edges 41 in the trapezoidal shape of the internal plate portions 13, and in particular those which are at the end opposite to the rear claw 21.

The connecting device 1 also carries a locking element 42, for locking the securing element 12 on to the blade 2. This locking element is adapted to actuate the means for absorbing longitudinal and transverse clearances 27 and 40 respectively, while ensuring that the securing element is held in the opening 8 of the blade.

Referring to FIGS. 4 to 7, the locking element 42 is in the form of a lever 43 which is of generally U-shaped cross section, having side wing portions which are parallel to each other and substantially perpendicular to the base portion 45 of the U. The wing portions 44 are resilient, and arranged at a spacing from each other which is greater than the width 1 defined between the free edges, facing each other, of the two inward projections 29 of the internal plate portions 13 (see FIG. 2). At the level of the front end of the leveR 43, that is to say to the left as seen in FIGS. 4 and 5, the lever 43 has a nose 46 formed by partial truncation of the wing portions 44 in the region of their junction with the base portion 45 of the lever 43. This truncation gives a rectilinear portion 47 projecting from the extreme left hand end of the lever, substantially parallel to the base portion 45, to which it is joined through an inclined portion 48.

Figure 6:
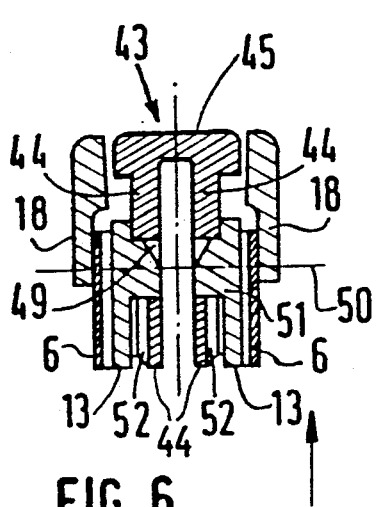
FIG. 6 is a view in partial cross section, taken on the line A—A in FIG. 5.

The lever 43 is arranged to tilt pivotally, and has openings 49, in this example in the form of round holes, formed through its wing portions 44. Referring to FIG. 6, the holes 49 are arranged to cooperate with pivot means defining a pivot axis 50 and consisting in this example of two protuberances 51, each of which projects from the inner face of a respective one of the internal plate portions 13, with the two protuberances 51 being aligned with each other.

In practice, a guide groove 52 is formed on the outer face of each of the side wing portions 44, and extends inwardly from the free or lower edge of the latter so as to merge with the holes 49, in such a way as to limit the need to bend the side wings away from the base portion 45 when the lever is being fitted on to the projections 51.

Figure 7:
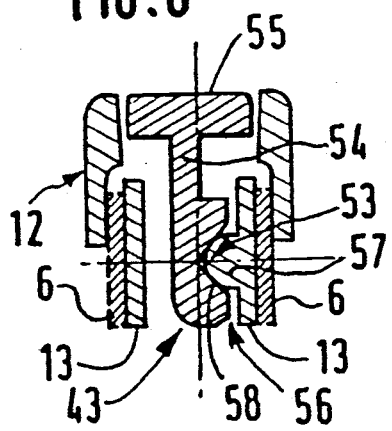
FIG. 7 is a view in partial cross section, taken on the line B—B in FIG. 5.

The tilting lever 43 also includes retaining means 53 for retaining the lever on the securing element 12. Referring in particular to FIG. 7, the retaining means 53 comprise a resilient tongue 54 which projects at right angles from a rear extension 55 of the base portion 45. The resilient tongue 54 includes, at its free end, mating means 56 which enable the lever 43 to be retained in position within the securing element 12.

In the example shown in FIG. 7, the mating means 56 comprise a hemispherical boss 57 projecting from the inner face of one of the internal plate portions 13, towards the central opening 25. The boss 57 engages within a hollow dimple 58 which is provided on one of the faces of the resilient tongue 54 lying facing towards the hemispherical boss 57.

The extension 55 of the base portion 45 terminates in an upwardly inclined portion, seen in FIGS. 1, 4 and 5, which serves as a finger tab or lifting element for operating the lever 43.

The operation of assembling and fitting the connecting device 1 will now be described with reference to FIGS. 4 to 7. In a first stage of the operation, the tilting lever 43 is brought into the central opening 25 delimited by the internal plate portions 13. The lever is presented in a direction which is substantially perpendicular to the tilting axis 50 defined by the securing element 12. More particularly, the guide grooves 52 are brought into cooperation with the projections 51 defining the axis 50, in such a way that the side wings 44 of U-shaped cross section, during the movement in which the lever 43 penetrates into the opening 25, bend towards each other until the projections 51 snap into the openings 49 of the side wings 44, thus releasing the latter from the pressure exerted by the projections 51. In this position, the lever 43 is thus in pivoting relationship with the securing element 12.

In a second stage of the operation, the securing element 12, now carrying the lever 43, is engaged in the opening 8 of the main stirrup 5 of the windshield wiper blade 2, with the pivoting coupling element 11 on the outside. During this engagement, the flanks 6 of the inverted U-shaped channel section of the main stirrup 5 become gripped between the inner surfaces of the external plate portions 18 and the outer surfaces of the flat sections 36 of the inward projections 28. The rear edge 10 of the opening 8 is then trapped in the rear claw 21 of the securing element 12, so that the edge 10 then lies in contact with the rear wall 16, with the internal flank 17 and rear flank 20 engaging respectively on the inner surface and outer surface of the central web 7, in the region of the rear edge 10.

In this position, the connecting device 1 is coupled with the arm 2 in the region of the rear edge of the opening 8, in both vertical directions. It is also coupled with the blade 2 at the level of the front edge 9 of the opening 8 by engagement of the free edge 24 on the outer face of the central web 7 of the U-shaped channel, in the vicinity of the front edge 9 and by contact of the inclined portion 41 with the latter. The nose 46 of the lever 43 then lies within the central opening 25 in such a way that the rectilinear portion 47 lies facing the inner surface of the central web 7, in the vicinity of the front edge 9 of the opening 8.

Once this configuration has been reached, a force is exerted, typically by hand, on the terminal finger piece of the lever 43, so as to rotate the latter around the pivot or tilting axis 50. During this rotational movement, which brings the lever into its final position shown in FIG. 5, the side wing portions 44 of the lever 43 engage on the inward projections 29, and more particularly on their flat portions 32. Having regard to the fact that the overall spacing between the side wings 44 is greater than the width 1 between the free facing surfaces of the projections 29, the side wings 44 exert a force on the latter in such a way that the internal plate portions 13 become deformed transversely. This then involves displacement of the free ends of the outward projections 28, and more particularly their flat portions 36, engage on the inner faces of the flanks 6 of the U-shaped channel of the main stirrup 5.

Thus any clearance that may exist between the free ends of the outward projections 28 and the inner face of the flank 6 is systematically absorbed as the lever 43 is introduced into the opening 25.

During the fitting of the securing element 12, if the length of the internal plate portions 13 is greater than the length of the opening 8, the inclined edge 41 defined by the trapezoidal shape of the plate portions 13 comes into contact with the front edge 9 of the opening 8. As a result, the free edge 24 of the front cross wall 19 is no longer brought into contact with the outer face of the central web 7 of the stirrup 5. While the lever 43 is being rotated, the rectilinear portion 47 comes into engagement, in the vicinity of the front edge 9 of the opening 8, with the inner face of the central web 7 of the stirrup 5. This causes the securing element 12 to move in longitudinal translational movement by sliding of the inclined edge 41 on the edge 9, until the free edge 24 of the front cross wall 19 comes into contact with the outer face of the central web 7 of the stirrup 5.

Thus, besides the fact that any transverse clearance is taken up, the lever 43 activates the means for absorbing any longitudinal clearance, until the securing element is immobilized in the opening 8 between the rear wall 16 of the rear claw 21 and the inclined edge 41 of the internal plate portions 13 together with the rectilinear portion 47 of the lever 43. In addition, the lever 43 is locked in position by cooperation of the dimple 56 on the resilient tongue 54 with the boss 57 on one of the plate portions 13.

Figure 8:
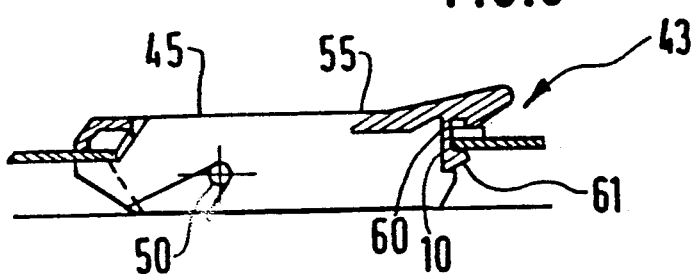
FIG. 8 shows another embodiment of the connecting device according to the invention.

Referring now to FIG. 8, this shows a modification of a connecting device 1, in which the locking means, 53, for locking the lever 43 within the securing element 12, and the means for absorbing any longitudinal clearance, are both carried out by the same member. To this end, the extension 55 of the base portion 45 of the lever 43 has a resilient web 60 at the point where contact is made with the rear edge 10 of the opening 8. The web 60 has a boss 61 formed on its free end. The boss 61 extends at right angles to the extension 55, being parallel to the direction of the rear edge 10.

The means for absorbing transverse clearance is controlled by the lever 43, in the same way as is described above, the only difference being in the means for absorbing any longitudinal clearance. Thus, during the tilting movement of the lever 43 about the pivot axis 50, the boss 61, being at the level of the rear edge 10 of the opening 8, causes the web 60 to become deformed elastically in the longitudinal direction, for entry into the opening 8. After passing through the opening 8, the boss 61 then lies against the inner face of the central web 7 of the stirrup 5, and the resilient web 60 relaxes back into engagement on the rear edge 10. If there is a longitudinal clearance between the longitudinal edge of the internal plate portion 13 and the front edge 9 of the opening 8, the web 60 then exerts a thrust on the securing element 12, and thus a thrust on the projections 51 carried by the plate portions 13, until the front edge 9 is in contact with the longitudinal edge of the plate portion 13. In this way any clearance is fully taken up.

The boss 61 serves as a locking means for locking the lever 43 in the opening 25 of the securing element 12. The resilient web 60 thus serves two purposes, namely to support the boss that acts as a locking means, and also to ensure that any longitudinal clearance between the securing element and the opening 8 is taken up. In addition, this arrangement enables the rear claw 21 to be omitted.

Without departing from the scope of the invention, the inclined edge 41 described above can of course be used for taking up any longitudinal clearance in this embodiment. Similarly, this means for absorbing longitudinal clearance can be associated with the retaining means 53 previously described.

The present invention is not limited to the embodiments described above, but embraces any variant. In particular, the conecting device 1 which may easily be made in synthetic material, so that the device may include an integral air deflector as shown in FIG. 1.

What is claimed is:

1. A connecting device for the articulation of a windshield wiper blade on a windshield wiper arm, the blade having an inverted U-shape defined by a pair of flanges connected by a web with an opening in said web thereof, said opening having a transverse and longitudinal dimension wherein the connecting device comprises a securing element seated in said opening in said web with transverse and longitudinal clearance therebetween, said securing element connected to a pivoting coupling element for articulation on the wiper arm, the securing element further including movable means for absorbing said transverse and longitudinal clearance, said movable means disposed in said opening of said web, and a locking element for locking the said securing element on the blade, the locking element being adapted to move said movable means for absorbing both said transverse and longitudinal clearance.

2. A connecting device according to claim 1, wherein the said means for absorbing clearance comprise first clearance absorbing means for longitudinal clearances and second clearance absorbing means for transverse clearances, the said first and second means being associated with each other.

3. A connecting device according to claim 1 or claim 2, wherein the said securing element includes internal plate portions, and projections on the said internal plate portions constituting means for absorbing transverse clearance.

4. A connecting device according to claim 1, wherein the securing element includes internal plate portions having an inclined surface, for cooperation with a front edge of the said opening in the wiper blade whereby to absorb longitudinal clearance.

5. A connecting device according to claim 1, wherein the said locking element is a lever, the device further including means mounting the said lever for tilting with respect to the securing element.

6. A connecting device according to claim 5, wherein the securing element includes means defining a pivot axis, the said lever being mounted on the pivot axis for rotation thereon.

7. A connecting device according to claim 5, wherein the lever includes a nose for immobilising the securing element in the said opening of the wiper blade.

8. A connecting device according to claim 5, wherein the securing element has an opening for accommodating the lever, the lever further including retaining means for securing the lever in the said opening.

9. A connecting device according to claim 8, wherein the retaining means comprise a first element and a second element, one of which is a resilient tongue and the other is an element of the securing element, one of these elements being formed with a male portion and the other with a female portion for cooperation with each other to constitute the said retaining means.

10. A connecting device according to claim 1, wherein said opening has a front and rear edge and the means for absorbing clearance comprise a resilient web for cooperation with the rear edge of the said opening in the wiper blade whereby to absorb longitudinal clearance, and whereby also the said web locks the locking element to the wiper blade.

* * * * *